United States Patent

Ramirez

[11] 3,944,971
[45] Mar. 16, 1976

[54] HIGH/LOW TIRE PRESSURE SIGNAL DEVICE

[75] Inventor: Ciro Ramirez, Midway City, Calif.

[73] Assignees: Ciro Ramirez; Edward J. Readman; Norman St. Jean; S. T. Chavarria, all of Midway City, Calif.

[22] Filed: Oct. 21, 1974

[21] Appl. No.: 516,370

[52] U.S. Cl.............................. 340/58; 200/61.25
[51] Int. Cl.² ........................................ B60C 23/02
[58] Field of Search ......... 340/58; 200/61.22, 61.25

[56] References Cited
UNITED STATES PATENTS

| | | | |
|---|---|---|---|
| 3,523,450 | 8/1970 | Openshaw et al. | 340/58 X |
| 3,710,314 | 1/1973 | Bell et al. | 340/58 |

*Primary Examiner*—Alvin H. Waring
*Attorney, Agent, or Firm*—Harold C. Horwitz

[57] ABSTRACT

A tire pressure sensing and warning device will indicate automatically when the air pressure in any one of the vehicle tires drops below or exceeds a predetermined level. The device will not interfere with the changing of the tires and rims on any of the vehicle wheels.

3 Claims, 5 Drawing Figures

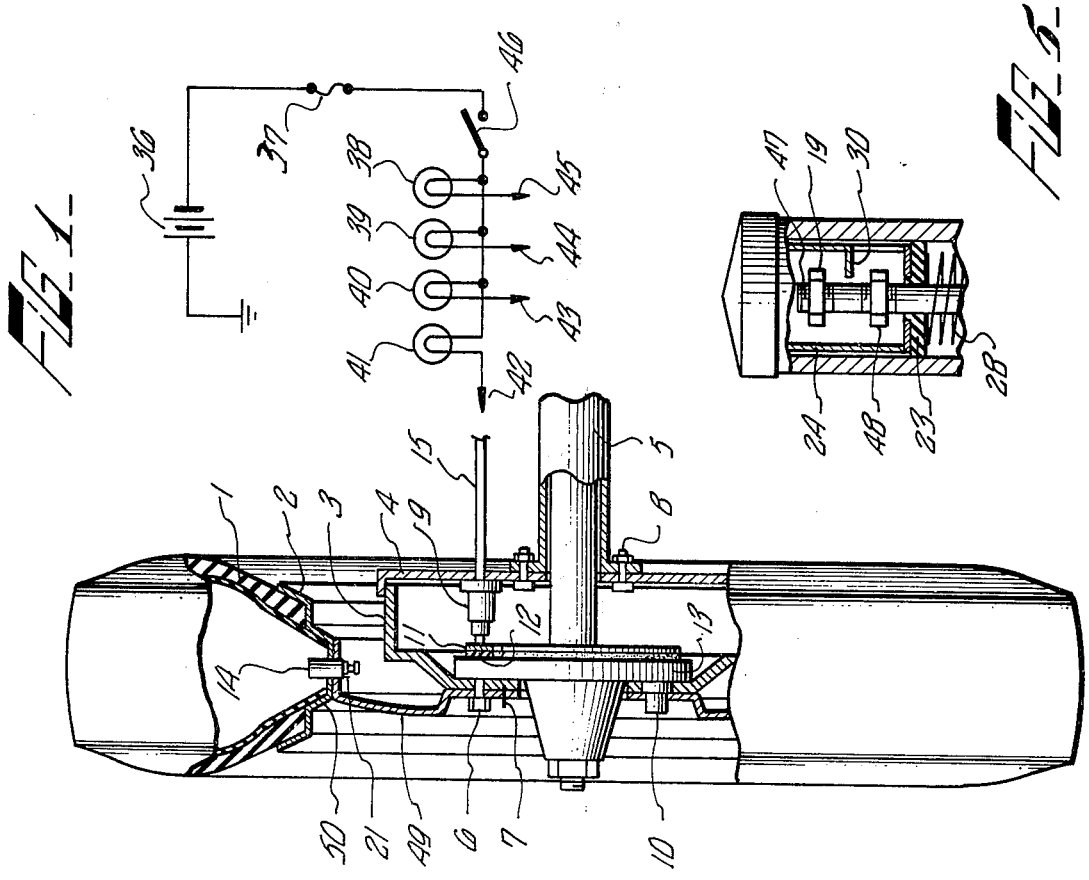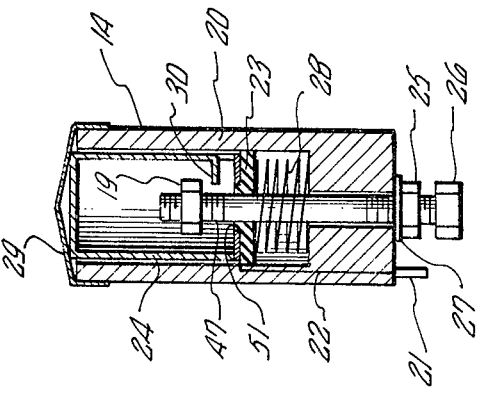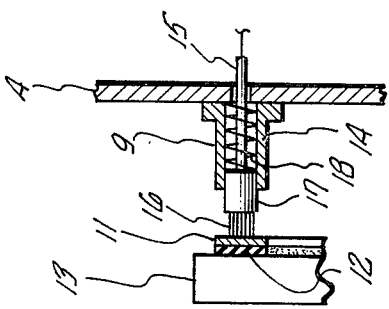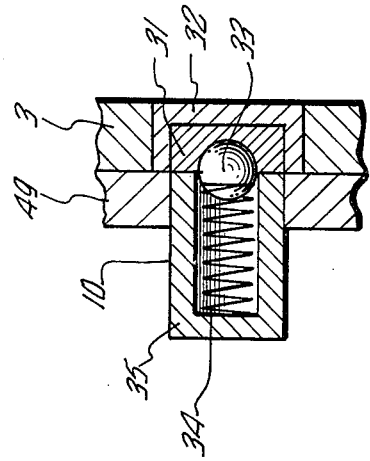

ved Description

HIGH/LOW TIRE PRESSURE SIGNAL DEVICE

BACKGROUND OF THE INVENTION

1. Field of the Invention

This invention relates to a high/low tire pressure signal device whereby a signal is produced in response to an abnormal pressure existing within a vehicle tire.

2. Description of the Prior Art

The prior art has disclosed a number of devices which have as their object the warning of vehicle low tire pressure. Such devices have utility as safety feature of automotive as well as aircraft landing wheels and in commercial as well as private vehicles. Such devices in the prior art have received poor commercial acceptance because of complexity, cost and lack of reliability.

Prior art devices include U.S. Pat. Nos. 3,523,450 and 3,710,314. Particular disadvantages of the first device are the unduly complicated resistor type switch that is used and the need of making a manual disconnect of system components before removing a wheel. The present invention overcomes both of these disadvantages as set forth below. The second device has discontinuous signal means such that tire pressure is indicated only when the car is in motion. The tire pressure signal is communicated through a striker device which is subjected to a blow with each wheel rotation. Severe and continuous shocks to the switch mechanism could be a source of diminished device life. The present invention has continuous signal means and is not subjected to continuous shocks.

SUMMARY OF THE INVENTION

The preferred embodiment of the present invention includes a pressure sensing device of compact, reliable assembly that can be mounted on the tire rim so that if the tire loses its pressure the device will not come into contact with the tire and damage the device.

The preferred pressure sensing device comprises a housing mounted on the rim. A diaphragm having its outer side exposed to the pressure within the tire closes the end of the housing. A spring biased piston mounted within the housing engages the inner side of the diaphragm so that as the diaphragm responds to the pressure changes within the tire, the piston is displaced from a normal to an abnormal position. When the piston is displaced to an axial position associated with an abnormal tire pressure, a normally open switch becomes closed and energizes an electrical signal circuit so that the vehicle operator is warned, through a warning light or audible alarm, that an abnormal tire pressure condition exists.

The pressure sensing device has a novel switch means for actuating the signal circuit upon a predetermined low pressure condition being reached. At normal tire pressure, a rod within the piston is displaced from the piston wall so that as the tire loses pressure the spring bias tends to close the switch formed by the rod and a contact extending outwardly from the piston wall. The distance between the rod and the contact is adjusted for closure at a predetermined low pressure condition.

A novel connector means communicates air pressure switch condition to an annular insulated ring mounted on the rotating part of the wheel and then to a spring loaded electrical brush connected to the warning lights or buzzer.

On object of the present invention is to provide an improved, compact, pressure-responsive signaling device for vehicle tires which can be mounted on a rim assembly.

Another object of the present invention is to provide an improved low pressure sensing device for a vehicle tire which takes the form of a balanced piston reciprocally mounted and selectively balanced in one direction by spring means and the opposite direction by tire pressure, with the spring means causing the piston to move into a circuit closing relationship with a rod upon the loss of a predetermined amount of tire pressure thereby actuating signal means.

Still another object of the present invention is to provide novel connecting means between the tire rim and drum by ball bearing means with the ball bearing received in a well mounted on the drum.

DESCRIPTION OF THE DRAWINGS

FIG. 1 is a sectional view through a tire wheel assembly with the tire pressure sensing device built in accordance with the present invention and showing the preferred electrical circuit;

FIG. 2 is a sectional view through the tire pressure sensing device;

FIG. 3 is a sectional view through the brush assembly with insulated annular ring shown mounted on drum;

FIG. 4 is a sectional view of ball bearing connecting means.

DESCRIPTION OF THE PREFERRED EMBODIMENTS

The preferred embodiments are described with reference to a system for detecting an under inflated tire. A second embodiment of the invention illustrates how the air pressure switch can be modified to detect either an abnormal high or low pressure condition. It is to be understood that the preferred embodiments can be employed on tire rims of either automotive, aircraft, trucks or buses to warn the operator of the vehicle that an unsafe tire pressure condition exists.

Referring to FIG. 1, a vehicle tire 1 is shown mounted on a wheel 49 having a pair of spaced annular rims 2 connected by a center section 50 having a reduced diameter. The inner periphery of the tire 1 are mounted on the rims 2 in accordance with the usual practice.

The wheel 49 is secured to the drum assembly 3 by bolts 6 after alignment pin 7 has been properly seated in wheel 49 center section.

A pressure sensing device generally indicated at 14 is mounted on the center portion 50. The pressure sensing unit 14 is mounted within the interior side of the tire 1 thereby eliminating the necessity for a separate pneumatic connection with the tire 1.

As can be seen in FIG. 1 a ball bearing connector device is shown generally at 10 and in cross section in FIG. 4. A brush system is shown generally at 9 and in cross section in FIG. 3. The brush system is connected to vehicle warning lights 38, 39, 40 and 41 at points 42, 43, 44 and 45.

FIG. 2 shows the preferred pressure sensing device 14 in cross section comprising a cylindrical housing 20 and composed of insulative material and having a bolt 47 threaded through the bottom side of said housing. Bolt 47 is secured to pressure sensing device with nut 25 and washer 27. Top side of sensing device 14 is terminated with diaphragm 29. Piston 24 is mounted within interior bore of cylindrical housing 20 and rests on insulative washer 23. Bolt 47 is insulated from piston 24 by insulative washer neck 51. Piston top side bears against inside diaphragm 29 wall. Tire pressure on diaphragm forces piston 24 downwardly until spring 28 force equals tire air pressure and piston is in equilibrium. A protuberance 30 extends at right angles from piston wall and serves as switch contact point. Nut 19 is adjusted on bolt 47 for predetermined spacing between nut and protuberance 30 so that when tire pressure is diminished to a dangerous level, piston will be forced upwardly by spring force and switch closure will be effected. Pressure sensing device is mounted on rim center section 50 with nut 26. Bolt 47 is at ground potential as is one terminal of vehicle battery 36. Piston 27 is electrically connected to terminal 21 by wire 22.

The ball bearing connector shown in cross section in FIG. 4 comprises a wheel 49 mounted section of insulative housing material 35 and a ball bearing 33 switch member retained in said housing with spring means 34. Electrical connection (not shown) is made between terminal 21 and ball bearing switch member by connecting said terminal to spring 34. Mating half section 31 of ball bearing 33 switch is mounted in drum assembly 3 and comprises cylindrical conductor 31 with hemispherical seat dimensioned to receive ball bearing 33 when wheel 49 is connected to drum assembly 3. Pin 7 on wheel 49 provides proper alignment with drum assembly 3. Switch half section 31 is insulated from drum contact with insulator 32.

Electrical connection (not shown) is made between cylindrical conductor 31 and annular ring 11 by connecting said cylindrical conductor to annular ring with a conventional electrical wire. A completed electrical circuit can thus be traced from device ground potential through battery 36, fuse 37, switch 46, lamp 41, brush 16, annular ring 11, wire (not shown) connecting annular ring 11 to cylindrical conductor 31, ball bearing 33, spring 34, wire (not shown) connecting spring 34 to terminal 21, wire 22, piston 24, protuberance 30, nut 19, bolt 47 connected to device ground potential.

FIG. 1 illustrates a typical means for forming an electrical circuit from the terminal 21 to the vehicle display console. This consists of an annular ring 11 insulated from the rotating part of the wheel 13 by insulative material 12 and a spring loaded 18 electrical brush 16 mounted within brush holder 17 which is carried by housing 14 mounted on fixed part of brake housing 4 shown in FIG. 3. Brush 16 communicates with warning light 41 through wire 15 connection to light terminal 42.

FIG. 5 shows an alternate pressure sensing device which accommodates sensing of high or low pressure tire condition by means of two switch nuts 19 and 48. As shown in FIG. 2, low pressure condition provides switch closure when nut 19 contacts protuberance 30. High pressure will force piston 24 downwardly and protuberance will contact second nut 48.

Although I have described but two preferred embodiments of our invention, it is to be understood that various changes and revisions can be made therein without departing from the spirit of the invention as expressed in the appendage claims.

I claim:

1. A tire pressure signal device for a vehicle having a pneumatic tire mounted on a wheel, comprising:
   a housing having a bore formed therein, said wheel having a central portion merging outwardly into a pair of annular rims for engaging the inner periphery of said tire, and said housing mounted on said central portion of said wheel;
   a diaphragm disposed within said bore and closing one end thereof;
   means providing a pneumatic connection between the outer side of said diaphragm and the pressure within said tire so that diaphragm flexes in response to a pressure change in said tire;
   a piston axially slidably disposed in said bore with a top engaged with inner side of said diaphragm and a protuberance on one side of piston wall;
   a spring disposed in the bore of said piston between bottom of said piston and bottom of said bore;
   a rod mounted in center of said bore extending through said piston and insulated therefrom, with nut adjustably mounted on top of said rod for selectively varying space between nut and piston protuberance;
   signal means responsive to the engagement of the piston protuberance against said nut.

2. The system as defined in claim 1, wherein said signal system means comprises:
   a normally open electrical circuit;
   a signal in the circuit responsive to closing of the circuit;
   a ball bearing connector mounted on said wheel;
   ball bearing receiving means mounted on said drum assembly;
   an insulated annular ring mounted on said drum assembly; and
   an electrical brush communicating with said annular ring and said signal circuit.

3. The system as defined in claim 1, wherein said rod includes a second nut adjustably mounted on said rod.

* * * * *